US009530209B2

United States Patent
Hatcher, Jr. et al.

(10) Patent No.: US 9,530,209 B2
(45) Date of Patent: Dec. 27, 2016

(54) METHOD OF DETERMINING THE LOCATION OF TIP TIMING SENSORS DURING OPERATION

(71) Applicant: Siemens Energy, Inc., Orlando, FL (US)

(72) Inventors: Clifford Hatcher, Jr., Orlando, FL (US); Joseph M. Brindisi, Winter Springs, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 205 days.

(21) Appl. No.: 14/155,606

(22) Filed: Jan. 15, 2014

(65) Prior Publication Data

US 2015/0199805 A1    Jul. 16, 2015

(51) Int. Cl.

| | |
|---|---|
| *H04N 7/18* | (2006.01) |
| *G06T 7/00* | (2006.01) |
| *G01B 11/26* | (2006.01) |
| *G01M 15/14* | (2006.01) |
| *G04F 13/02* | (2006.01) |
| *G01H 3/00* | (2006.01) |
| *G01H 9/00* | (2006.01) |
| *G01B 11/16* | (2006.01) |
| *G01H 1/00* | (2006.01) |
| *F01D 21/00* | (2006.01) |

(52) U.S. Cl.
CPC ............... *G06T 7/004* (2013.01); *G01B 11/16* (2013.01); *G01B 11/26* (2013.01); *G01H 3/00* (2013.01); *G01H 9/004* (2013.01); *G01M 15/14* (2013.01); *G04F 13/02* (2013.01); *H04N 7/18* (2013.01); *F01D 21/003* (2013.01); *G01H 1/006* (2013.01)

(58) Field of Classification Search
CPC ............................ G02B 23/2492; G06T 7/004
USPC ........................ 348/82, 207.99–376; 385/116
See application file for complete search history.

(56) References Cited

U.S. PATENT DOCUMENTS

| | | | | |
|---|---|---|---|---|
| 4,998,005 | A | * | 3/1991 | Rathi .................. B23K 26/032 219/121.62 |
| 8,184,151 | B2 | | 5/2012 | Zombo et al. |
| 8,478,547 | B2 | | 7/2013 | Hadley et al. |
| 2010/0074572 | A1 | | 3/2010 | Zheng et al. |
| 2010/0074727 | A1 | | 3/2010 | Twerdochlib |

(Continued)

OTHER PUBLICATIONS

Memtek (Internet Archive Way Back Machine. (Aug. 16, 2011). Retrieved from Internet Archive Way Back Machine:https://web.archive.org/web/20110816041630/http://www.visionresearch.com/Products/High-Speed-Cameras/v341/).*

(Continued)

*Primary Examiner* — Jamie Atala
*Assistant Examiner* — Masum Billah

(57) ABSTRACT

A combination probe is positioned at a location in a stationary portion of a turbo machine that defines a gas flow path and is configured to detect a moving portion of the turbo machine within the gas flow path. The combination probe includes a tip timing sensor configured to sense when the moving portion is located proximate to the location of the probe, and an optical component configured to have a field of view that includes the moving portion when the moving portion is located proximate to the location of the probe. There is also an image capture device coupled to the optical component to capture an image of the field of view. The image can be used to determine the particular blade tip location within the field of view which is also the blade tip location sensed by the tip timing sensor.

16 Claims, 4 Drawing Sheets

(56) References Cited

U.S. PATENT DOCUMENTS

| | | | |
|---|---|---|---|
| 2011/0069165 A1* | 3/2011 | Zombo | F01D 21/003 |
| | | | 348/82 |
| 2012/0101775 A1 | 4/2012 | Mitchell et al. | |
| 2012/0296593 A1* | 11/2012 | Seccombe | F01D 11/14 |
| | | | 702/94 |
| 2013/0194379 A1 | 8/2013 | Baleine et al. | |
| 2013/0226518 A1 | 8/2013 | Jousselin | |
| 2015/0097582 A1* | 4/2015 | Szedlacsek | G01B 7/14 |
| | | | 324/662 |

OTHER PUBLICATIONS

Memtek (Internet Archive Way Back Machine. (Aug. 16, 2011). Retrieved from Internet Archive Way Back Machine: https://web.archive.org/web/20110816041630/http://www.visionresearch.com/Products/High-Speed-Cameras/v341/).*

* cited by examiner

METHOD OF DETERMINING THE LOCATION OF TIP TIMING SENSORS DURING OPERATION

FIELD OF THE INVENTION

The present invention relates to the field of power generating equipment and, more particularly to blade tip timing monitoring of power generating equipment

BACKGROUND OF THE INVENTION

In the development of gas turbine engines, it is beneficial to measure the vibration (both amplitude and frequency) of the rotating blades. From such measurements, the induced stresses in the blades may be determined and action taken to avoid stresses which are high enough to cause damage to the blades.

It is known to mount strain gauges on rotating turbine blades to provide information about the amplitudes and frequencies of vibration of the blades. Strain gauges may be provided on each blade, and connected to a telemetry system mounted on the rotor, which transmits the measurements from the rotor. Due to the number of strain gauges required to fully determine the vibration, the telemetry system can be complex, large and time consuming to install within the rotor. Also due to this complexity, it is common practice to instrument a sampling of blades instead of all blades, and therefor blade to blade variation is often not detected An alternative technique for characterizing blade rotation is "tip timing" in which a non-contact probe mounted on the turbine casing is used to measure the time at which a blade passes This time is compared with the time at which the blade would have passed the probe if it had been undergoing no vibration. This is termed the "expected arrival time" and can be calculated from the rotational position of the particular blade and the velocity of the rotor.

The difference between the expected arrival time and the actual arrival time can be multiplied by the turbine blade tip velocity to give the displacement of the blade from its expected position. Data from a plurality of sensors can be processed to obtain the amplitudes and frequencies of vibration of the blades The relationship between blade deflection and stress can vary dramatically over a small area of the blade. Accordingly, there is currently an unmet need for a tip timing system that provides information related to a tip timing sensor's location over a rotating blade.

SUMMARY OF THE INVENTION

One aspect of the present invention relates to a combination probe positioned at a location in a stationary portion of a turbo machine that defines a gas flow path and configured to detect a moving portion of the turbo machine within the gas flow path. The combination probe includes a tip timing sensor configured to sense when the moving portion is located proximate to the location of the probe, and an optical component configured to have a field of view that includes the moving portion when the moving portion is located proximate to the location of the probe. There is also an image capture device coupled to the optical component to capture an image of the field of view In further aspect of the invention, the moving portion can be a blade tip and the image can be used to determine the particular blade tip location within the field of view which is also the blade tip location sensed by the tip timing sensor.

Another aspect of the present invention relates to a method using a probe positioned at a location in a stationary portion of a turbo machine that defines a gas flow path and configured to detect a moving portion of the turbo machine within the gas flow path. The method includes sensing, using a tip timing sensor of the probe, when the moving portion is located proximate to the location of the probe, and sensing, using an optical component of the probe, a field of view that includes the moving portion when the moving portion is located proximate to the location of the probe An image capture device coupled with the optical component can be used to capture an image of the field of view In a further aspect of the present invention, the moving portion can comprise a blade tip and the image can be analyzed to determine the particular blade tip location within the field of view which is also the blade tip location sensed by the tip timing sensor.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

Figure 1:
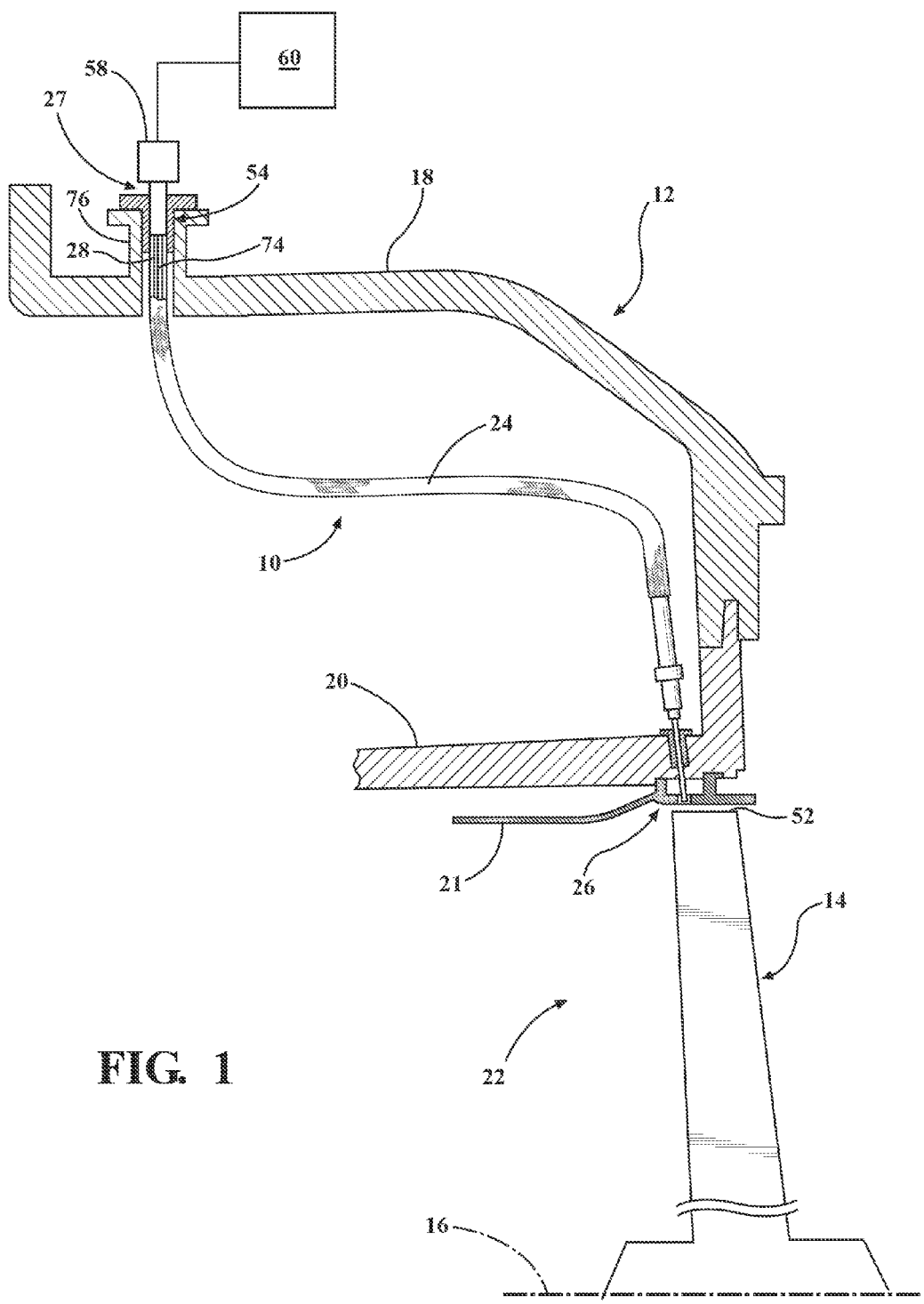
FIG. 1 is a diagrammatic view illustrating a turbine and a tip timing and imaging probe in accordance with the principles of the present invention.

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Embodiments of the present invention relate generally to a Non-Intrusive Stress Measurement (System) (NSMS) which is a method for determining dynamic blade stresses in rotating turbomachinery. NSMS is also known by the names "Blade Tip Timing" (BTT), "Arrival Time Analysis" (ATA), "Blade Vibration Monitoring" (BVM) Beruhrungslose Schanfel Schwingungsmessung (BSSM), and "Blade Health Monitoring" (BHM) NSMS uses externally mounted sensors to determine the passing times of turbomachinery blades. The passing times after conversion to deflections, can be used to measure each blade's vibratory response characteristics such as amplitude/stress, phase, frequency, and damping. Since every blade can be measured, effects such as flutter, blade mistuning, and nodal diameter can also be characterized Embodiments of the present invention can be used in all sections of a gas turbine engine (fan, compressor, and turbine) and on other turbo-machinery equipment including, but not limited to, power turbines or aero turbines. One of ordinary skill will recognize that the ability to apply the technology of the present disclosure to a given situation is dependent upon a sensor type that can meet the appropriate environmental requirements.

Typical tip timing methods involve a very accurate measurement of the times at which the blades pass by a series of equally or unequally spaced sensors Usually, the sensor set consists of a series of laser probes mounted in the turbine housing which reflect a beam of light off the blade as it passes. If the blade is rotating at a constant rate, a particular blade should pass each sensor at a predictable time. Deflection due to vibration causes the blade to pass the sensor either earlier or later than predicted, hence the difference of these times can be used to calculate the deflection from the initial position for each individual blade. By using a powerful laser with a small point of focus (e g., 1 mm$^2$) fast data acquisition hardware, a tip timing system is able to detect vibrations of less than 0.2 μm at the working speed of a turbine Methods of capturing the time at which the blade passes a sensor can also involve the use of magnetic and capacitive type probes, and associated electronic hardware with very fast data acquisition hardware As described in detail below, a tip timing system can be augmented with an image capturing device that is paired with each of the tip timing sensors. At each location that a tip timing sensor is located around the turbine, a respective image capturing device can be located as well Thus, not only is the timing of a blade being detected but an image of a section of the blade is captured as well In particular, an image of a tip of the blade can be captured at a moment in time that corresponds to the tip timing sensor detecting that blade tip Referring initially to FIG. 1, an imaging system 10 is illustrated for providing imaging of a component in a gas turbine engine 12 during operation of the turbine engine 12 In particular, the imaging system 10 is shown mounted to the turbine engine 12 and positioned extending between an outer casing wall 18 and a blade ring or inner cylinder structure 20 supported radially inwardly from the outer casing wall 18 in a turbine section of the turbine engine 12. In the illustrated embodiment, the imaging system 10 is provided for imaging a location on a component comprising an elongated turbine blade 14. The blade 14 extends in a hot gas path 22 defined within the blade ring or inner cylinder structure 20 of the engine 12, and the blade 14 is supported for rotation about a rotational axis 16 for a rotor 17 (see FIG. 4D) of the engine 12.

FIG. 1 is provided to show one example location of the imaging system 10 which can comprise a flexible optical fiber 24 including an imaging end 26 located at an inner end of the imaging system 10 for imaging a component, i e, the blade 14, in the hot gas path 22 of the engine 12 The fiber 24 further includes a viewing end 28 located at an outer end 27 of the imaging system 10 for providing an image of the blade 14 (e g., the blade tip 52) at a location displaced from the hot gas path 22, i e., at a location outside of the outer casing 18. The imaging end 26 can be mounted through an aperture in the blade ring or inner cylinder structure 20, and may extend to a vane shroud portion 21

Referring to FIG. 1, the viewing end 28 of the flexible fiber 24 may be formed with substantially the same construction as described for the imaging end 26 The outer end 27 of the imaging system 10 extends to an access port 76 on the outer casing wall 18 and includes a viewing housing 54 rigidly mounted to the access port 76 and configured to receive an end tip housing 74 at the viewing end 28 of the flexible imaging bundle 24. The viewing housing 54 may also enclose at least one optical element or component comprising a lens located for imaging light emitted from the fiber 24 at the viewing end 28 to a camera 58.

As seen in FIG. 1, the imaging system 10 may further include a processor 60 for controlling acquisition and recording of images received by the camera 58. One example camera 58 can be similar to FASTCAM SA3™ manufactured by Photron that utilizes CMOS sensor technology to provide mega pixel resolution up to 2,000 frames per second (fps). For example, these, and similar, cameras can provide 2,000 fps at 1,024 by 1,024 pixel resolution, and reduced resolution operations as fast as 120,000 fps. Furthermore they can be designed with different amounts of memory (e g., two, four or eight gigabytes onboard memory) and provide either color or monochrome images.

Figure 2A:
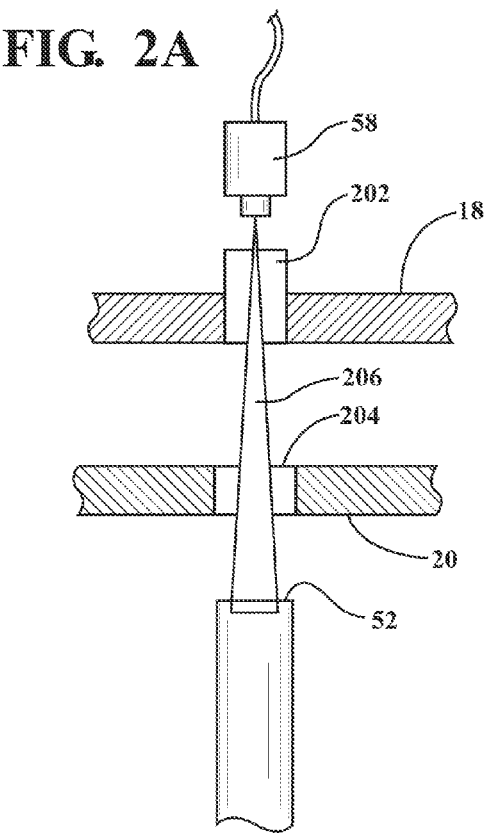
FIG. 2A and FIG. 2B illustrate additional conceptual positions of the various components of a system for imaging a blade tip in accordance with the principles of the present invention.
Figure 2B:
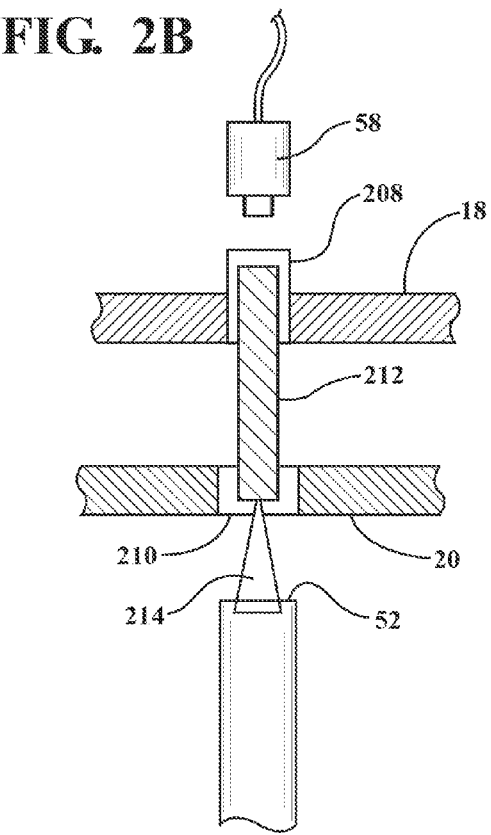

FIG. 2A and FIG. 2B illustrate additional conceptual positions of the various components of a system for imaging a blade tip in accordance with the principles of the present invention In these figures, the fiber 24 of FIG. 1 has been replaced with other optical components that allow the camera 58 to image a blade tip 52. In FIG. 2A a respective pressure window 202, 204 can be located in each of the outer casing 18 and the blade ring or inner cylinder structure 20. The camera 58 will have an effective field of view 206 of a portion of the blade tip 52 In FIG. 2B, two pressure windows 208, 210 are also used but an optical tube 212 couples the two pressure windows 208, 210 together. The optical components of FIG. 2B can provide a larger field of view 214 than the arrangement of FIG. 2A.

In FIGS. 1, 2A and 2B a single camera or single imaging device is depicted. However, multiple such imaging devices can be located around the periphery of a turbine to capture images of the rotating blades at different positions. Similarly, only a single blade of a single row is depicted in these figures but multiple imaging devices and cameras can be located at different positions to capture images of different rows of blades.

One of ordinary skill will recognize that selection for example distances and construction of the optical components will vary depending on physical parameters of various turbines. An imaging spot of between 10-15 mm in diameter at a tip of a turbine blade provides beneficial information regarding that blade. U.S. Patent Application Publication 2013/0194379 provides details regarding configuration and construction of various optical camera systems that may be utilized in some embodiments of the present invention The disclosure of that printed publication is incorporated herein by reference, in its entirety.

Figure 3:
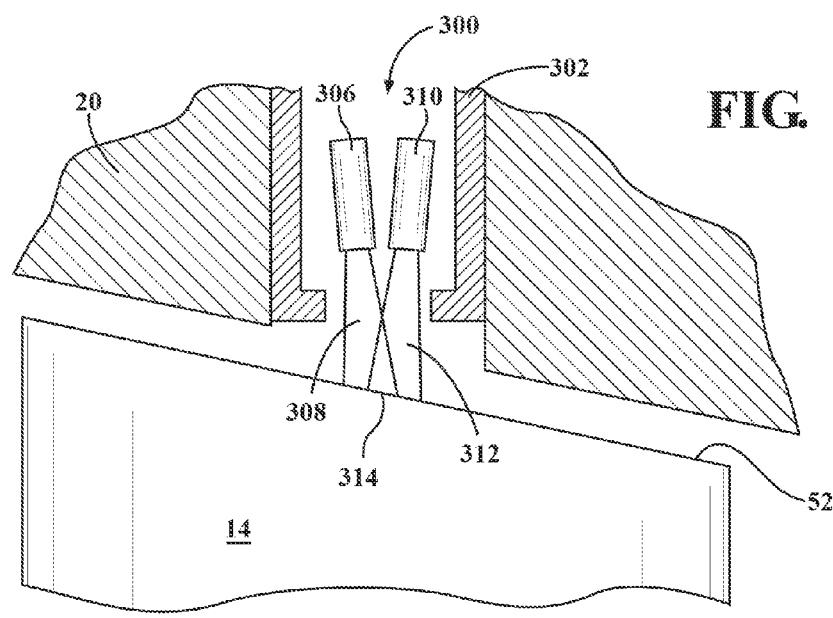
FIG. 3 illustrates a tip timing and imaging probe in accordance with the principles of the present invention.

FIG. 3 illustrates a tip timing and imaging probe in accordance with the principles of the present invention This combination probe 300 includes one or more optical components 310 that provide a field of view 312 so that an image of a portion 314 of the tip 52 of the turbine blade 14 can be captured (e.g, by the camera 58 of FIG. 1). The probe 300 also includes a tip timing sensor 306 that has a detection region 308 that intersects the blade tip 52 substantially near the imaged portion 314. As described above, the probe 300 can pass within a pressure window 302 that is bored into a blade ring or inner cylinder structure 20. Thus, FIG. 3 illustrates a probe 300 positioned at a location in a stationary portion (e.g. the blade ring or inner cylinder structure 20) of a turbo machine that defines a gas flow path and configured to detect a moving portion (e.g., the blade tip 52) of the turbo machine within the gas flow path The probe 300 includes a tip timing sensor 306 configured to sense when the moving portion 52 is located proximate to the location of the probe 300, and an optical component 310 configured to have a field of view 312 that includes the moving portion 52 when the moving portion 52 is located proximate to the location of the probe 300. The optical component(s) 310 probe 300 can be coupled to an image capture device (e.g., the camera 58 of FIG. 1) to capture an image of the field of view 312 that intersects the moving portion 52 at an image portion 314.

Although not shown in FIG. 3, the signals detected by the tip timing sensor 306 can be conveyed to an analysis computer that processes the signals as known to one of ordinary skill in the art Additionally, the imaged portion 314 within the field of view 312 of the optical components 310 can be conveyed by various techniques to a camera as described with respect to FIGS. 1, 2A and 2B and to a computer for analysis and/or storage As mentioned above, tip timing measures blade deflection by measuring the time a certain location of a blade passes under a probe (e.g, proximate to the probe). This deflection, for example bending or twisting, can be converted into a stress The conversion of "deflection" to "stress" is dependent on where on the blade the deflection is measured, and the relationship between deflection and stress can vary dramatically over a small area The combined probe 300 of FIG. 3 allows the location of the tip timing sensor 306 over, i.e., relative to, the blade 14 to be better understood With a location of the tip timing sensor 306 better understood, a reduction in the uncertainty in converting deflection to stress can be achieved.

Figure 4A:
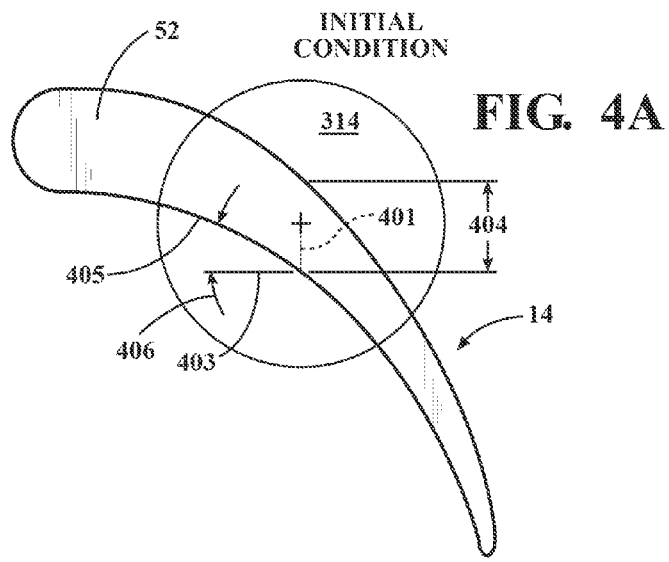
FIGS. 4A-C illustrate a radial inward image of a blade tip captured in accordance with the principles of the present invention.

FIG. 4A illustrates an image of a blade tip captured in accordance with the principles of the present invention. The imaged portion 314 of the blade tip 52 is shown for one particular image captured by the camera 58, and can be a two dimensional image of a portion of the blade tip 52. A center 402 of the image can also be identified. One of ordinary skill will recognize that there are many known techniques to determine a center of an imaged area and then use that as a reference point for different images from the camera 58 As a result, two different images from a stationary imaging system (e.g., the camera 58) can be registered using a common reference point (e g, the center 402) so as to allow comparison and analysis to determine differences between the two images.

Two example characteristics that can be identified in the image of FIG. 4A is a width 404 of the blade tip 52 (e g., the width at the center 402 of the image) and an angle 406 that the blade 52 makes with a horizontal line 403. In particular, a vertical line 401 can extend downward from the image center 402 until it reaches one edge 405 (e.g., the lower (pressure) side) of the blade 14 The horizontal line 403 extends outwardly from the edge 405 and forms an angle 406 with the edge 405 Even in low light conditions, various image analysis techniques can be used to distinguish what parts of the imaged portion 314 correspond to the blade tip 52 and what parts do not, thereby allowing the width 404 and angle 406 to be determined.

In some embodiments of the present invention, the imaged portion 314 can be presented to a technician that can manually analyze the imaged portion 314. In other embodiments, automatic image analysis techniques can be used to calculate the width 404 and angle 406. Regardless of the specific analysis techniques used, a specific location or portion of the blade tip that is being sensed by a tip timing sensor can be identified.

Figure 4B:
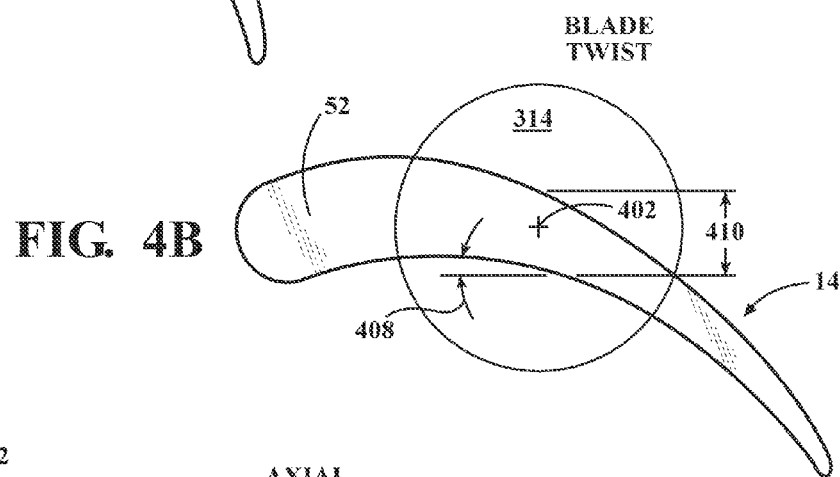
Figure 4C:
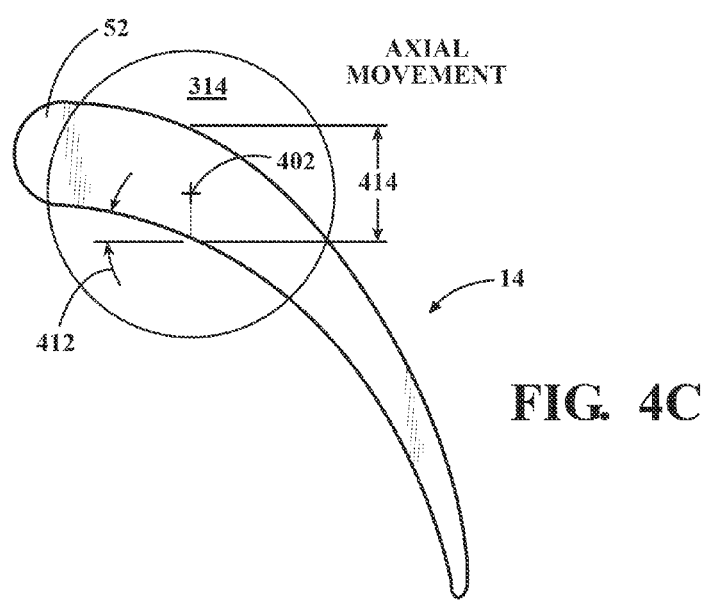
Figure 4D:
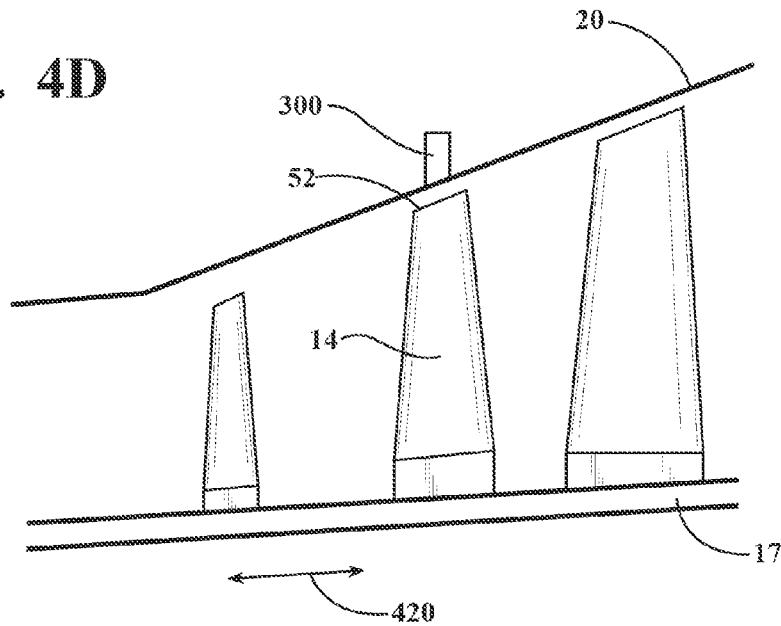
FIG. 4D is a partial view of a turbine that helps illustrate "axial movement" in accordance with the principles of the present invention.

The turbine and its components may operate in various conditions For example, a turbine can have transient conditions that occur during start-up, shut-down, changes in loading conditions and thermal transients while achieving thermal stabilization. These transient conditions may not be expected during full-load operation wherein the turbine is operating in a steady-state mode. Thus various strategies for acquiring images of the turbine blade tips along with tip timing sensing can be beneficial For example, the first several minutes of starting up a turbine can be a critical time to detect tip timing information. Similarly, if a load change on the turbine is made, then tip timing information may be beneficial Even without changes being made to the operation of the turbine, comparing tip timing information to similar conditions in the past provides benefits. Thus, during any of these times, capturing images to accompany that tip timing information is beneficial as well While the turbine blades can move, flex, bend, or distort in many different way, two particular types of movements include "blade twist" and axial movement. As compared to an initial condition depicted in FIG. 4A, blade twist is characterized by a width 410 that is substantially similar to the width 406 of the blade tip 52 in FIG. 4A. However, the angle 408 of FIG. 4B will be different than the angle 406 of FIG. 4A FIG. 4D is a partial view of a turbine that helps illustrate "axial movement" in accordance with the principles of the present invention. A rotor 17 that includes a blade 14 rotates around the rotational axis 16 as is more fully described earlier with respect to FIG. 1 Intentionally and/or unintentionally, the rotor 17 can move axially with respect to the probe, or the probe will move axially with respect to the rotor, generally as a result of thermal response (as shown by the arrow 420) such that a different portion of the blade tip 52 will be positioned under the probe 300. Referring to FIG. 4C, relative to the imaged portion 314 of FIG. 4A, the blade tip 52 will have a width 414 different than the width 404 from FIG. 4A and will typically have an angle 412 that is different than the angle 406 of FIG. 4A due to the varying configuration, i.e., chordal curvature of the blade.

Either manually or automatically, a respective width (e g., 404, 410, 414) and a respective angle (e g., 406, 408, 412) can be used together or separately to identify a portion of the blade tip 52 over which the probe 300 (and the tip timing sensor 306) is located. For example, the width and angle could be compared to a CAD model of the blade tip 52 to determine where the tip timing sensor 306 is located. Thus, the conversion from deflection to stress can be performed with less uncertainty.

The conversion from deflection to stress is merely an example of how imaging and tip timing can be used in conjunction with one another to analyze a turbine As mentioned above, a wide variety of imaging protocols can be implemented For example, a series of images of each blade of a row can be captured at one minute intervals (or some other time period) and compared to one another during transient operating conditions. This imaging information can be utilized to detect mistuning of turbine blades or to validate turbine operating models.

Figure 5:
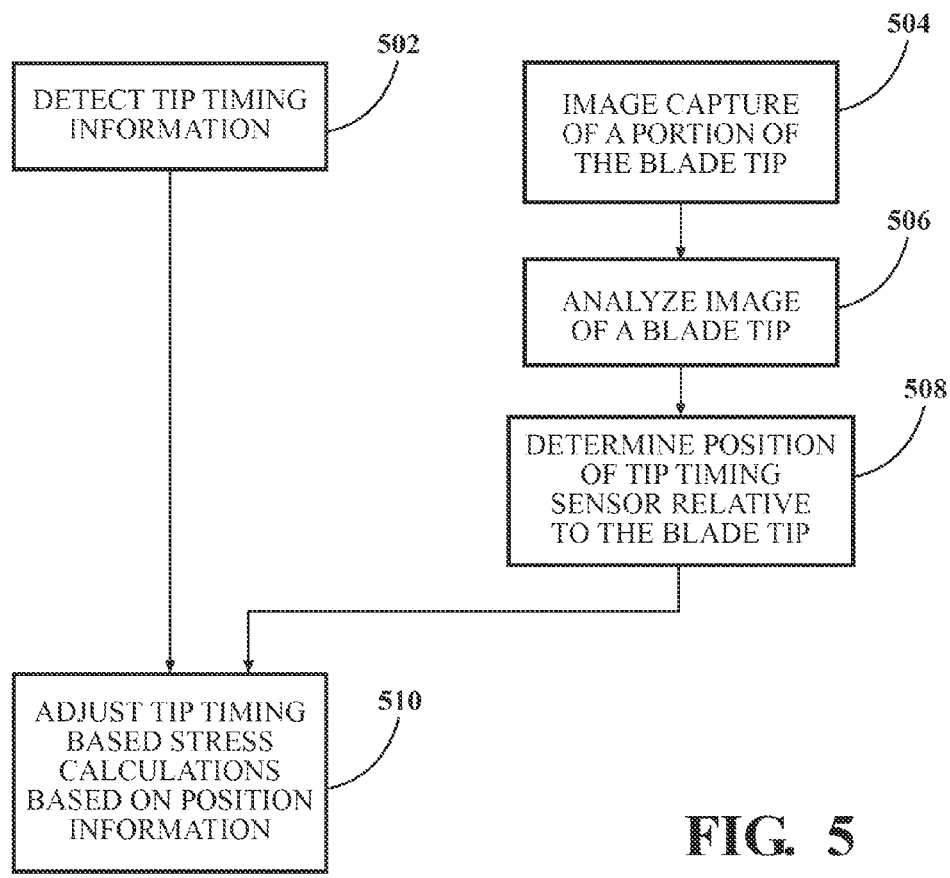
FIG. 5 is a flowchart of an example method to capture both tip timing information and a blade tip image in accordance with the principles of the present invention

FIG. 5 is a flowchart of an example method to capture both tip timing information and a blade tip image in accordance with the principles of the present invention. In step 502 a tip timing sensor or tip timing probe is used to detect tip timing information as conventionally understood by one of ordinary skill. In particular, the tip timing information provides a measurement of blade tip deflection for a turbine blade In addition to tip timing information, in step 504, a camera or other imaging system captures an image of a portion of the tip blade for which tip timing information was detected. Preferably, the portion of the blade tip that is imaged corresponds to the portion of the blade tip used to detect the tip timing information. The tip timing detection information in step 502 can be used to trigger the capturing of an image in step 504 or the images can be captured independently at a rate fast enough (e.g. between about 30,000 to 50,000 fps) to ensure an image is captured that corresponds to approximately the time period, i e, simultaneously, that the blade tip is detected by the tip timing sensor For example, blade tip images can be captured that have a respective time stamp. Those images that have a time stamp that correspond to a time when the blade tip was detected by the tip timing sensor can be stored. Those images that correspond to some other time period when the blade tip was not detected could be discarded The images that are captured can be stored in a computer (e.g., the computer 60 of FIG. 1) for later analysis or analyzed in near real-time. In step 506, analysis of the image of the blade tip portion is performed This analysis can be fully automated, manually performed by an operator, or a combination of both The purpose of the analysis of the image is so that, in step 508, a position of the tip timing sensor can be determined. In particular, the image analysis of step 506 allows a determination of what part of the blade tip is being captured in the image. For example, this location may be determined as a chordal location relative to a leading edge or trailing edge of the blade. Because the tip timing sensor is also using this same part of the blade tip to make its tip timing calculations, the image provides information about what specific part of the blade tip is being detected by the tip timing sensor. As mentioned above, the portion of the blade tip image can be analyzed to determine a width of the blade tip at a predetermined position (e.g, a center of the image) Also, the image can be analyzed to determine an angle of the blade tip such as, for example, an angle formed by the lower edge of the blade tip at the center of the image relative to a horizontal line. These measurements can then be compared to the known physical dimensions of the blade tip to determine a position on the blade tip that is being captured by the image. Thus, not only is an amount of deflection of the blade tip sensed but the location of where that deflection is occurring is also determined.

Accordingly, in step 510, stress calculations based on blade tip deflection measurements can be adjusted by taking into account the position information of the tip timing sensor relative to the blade tip While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention

What is claimed is:

1. An image analysis system comprising:
    a probe positioned at a location in a stationary portion of a turbo machine that defines a gas flow path and configured to detect a blade tip of a blade of the turbo machine within the gas flow path, the probe comprising:
        a tip timing sensor configured to sense when the moving portion is located proximate to the location of the probe within a detection region that intersects the blade tip, and
        an optical component configured to have a field of view that intersects the detection region, the field of view including the blade tip when blade tip is located proximate to the location of the probe; and
    an image capture device coupled to the optical component to capture an optical image of the field of view to optically determine a characteristic of the blade tip that varies in relation to movement of the blade tip relative to the optical component.

2. The image analysis system of claim 1, wherein the image capture device comprises a camera configured to capture images at a rate of about 30,000 to 50,000 frames per second.

3. The image analysis system of claim 1, comprising:
    an image analyzer configured to automatically determine a blade tip width in the optical image.

4. The image analysis system of claim 1, comprising:
    an image analyzer configured to automatically determine a blade tip angle in the optical image.

5. The image analysis system of claim 1, comprising:
    an image analyzer configured to automatically determine a blade tip width in the optical image;
    the image analyzer further configured to automatically determine a blade tip angle in the optical image; and
    the image analyzer further configured to determine a blade tip location of the field of view based on the blade tip width and blade tip angle determined from the optical image.

6. The image analysis system of claim 1, wherein the image capture device is configured to capture a series of optical images of the blade tip.

7. The image analysis system of claim 6, wherein the series of optical images is captured during transient operating conditions of the turbo machine.

8. A method using a probe positioned at a location in a stationary portion of a turbo machine that defines a gas flow path and configured to detect a blade tip of a blade of the turbo machine within the gas flow path, the method comprising:
    sensing, using a tip timing sensor of the probe, when the blade tip is located proximate to the location of the probe within a detection region that intersects the blade tip, and
    sensing, using an optical component of the probe, a field of view that intersects the detection region, the field of view including the blade tip when the blade tip is located proximate to the location of the probe; and
    capturing, using an image capture device coupled to the optical component, an optical image of the field of view to optically determine a characteristic of the blade tip that varies in relation to movement of the blade tip relative to the optical component.

9. The method of claim 8, wherein the image capture device comprises a camera configured to capture images at a rate of about 30,000 to 50,000 frames per second.

10. The method of claim 8, comprising:
    analyzing the optical image to automatically determine a blade tip width in the optical image.

11. The method of claim 8, comprising:
    analyzing the optical image to automatically determine a blade tip angle in the optical image.

12. The method of claim 8, comprising:
analyzing the optical image to:
automatically determine a blade tip width in the optical image;
automatically determine a blade tip angle in the optical image; and
determine a blade tip location of the field of view based on the blade tip width and blade tip angle.

13. The method of claim 8, wherein the image capture device is configured to capture a series of optical images of the blade tip.

14. The method of claim 8, wherein the series of optical images is captured during transient operating conditions of the turbo machine.

15. A method using a probe positioned at a location in a stationary portion of a turbo machine that defines a gas flow path and configured to detect a blade tip of a blade of the turbo machine within the gas flow path, the method comprising:
sensing, using a tip timing sensor of the probe, when the blade tip is located proximate to the location of the probe, and
sensing, using an optical component of the probe, a field of view that includes the blade tip when the blade tip is located proximate to the location of the probe;
capturing, using an image capture device coupled to the optical component, an optical image of the field of view; and
analyzing the optical image to:
automatically determining a blade tip width in the optical image; and
automatically determining a blade tip angle in the optical image;
analyzing timing data obtained using the tip timing sensor and data obtained from determination of the blade tip width and determination of the blade tip angle to determine vibratory response characteristics of the blade.

16. The method of claim 15, including determining a blade tip location of the field of view based on the blade tip width and blade tip angle.

* * * * *